United States Patent [19]

Ido et al.

[11] Patent Number: 4,589,773
[45] Date of Patent: May 20, 1986

[54] POSITION DETECTING SYSTEM

[75] Inventors: Satoshi Ido, Tokorozawa; Minpei Fujinami, Iruma; Yasuo Kato, Zama; Yoshio Sakitani, Iruma; Susumu Ozasa, Kashiwa, all of Japan

[73] Assignees: Nippon Telegraph & Telephone Public Corporation; Hitachi, Ltd., both of Tokyo, Japan

[21] Appl. No.: 333,295

[22] Filed: Dec. 22, 1981

[30] Foreign Application Priority Data

Feb. 23, 1981 [JP] Japan ............... 56-24329

[51] Int. Cl.$^4$ ............... G01B 11/00; G01B 15/00
[52] U.S. Cl. ............... 356/371; 356/1; 356/376
[58] Field of Search ........... 356/376, 381, 382, 375, 356/1, 371; 250/205

[56] References Cited

U.S. PATENT DOCUMENTS

| | | |
|---|---|---|
| 3,909,131 | 9/1975 | Waters ............... 356/376 |
| 4,299,491 | 11/1981 | Waters et al. ............... 356/376 |
| 4,325,640 | 4/1982 | Dreyfus et al. ............... 356/375 |
| 4,326,804 | 4/1982 | Mossey ............... 356/375 |
| 4,332,477 | 6/1982 | Sato ............... 356/376 |

OTHER PUBLICATIONS

Kelly, Brian O., "Lateral-Effect Photodiodes", *Laser Focus*, Mar. 1976.

*Primary Examiner*—R. A. Rosenberger
*Attorney, Agent, or Firm*—Antonelli, Terry & Wands

[57] ABSTRACT

A position detecting system suitable for the position control of the surface of a workpiece mounted in an electron beam exposure system is disclosed which includes an electrically-driven light source, a first optical system for focusing a light beam from the light source on a workpiece, a position-controlling table for mounting thereon the workpiece, a second optical system for focusing light reflected from the workpiece on a predetermined image surface, a photodetector having a light receiving surface arranged on the image surface, and a negative feedback amplifier for controlling the light source by the output of the photodetector.

10 Claims, 6 Drawing Figures

POSITION DETECTING SYSTEM

BACKGROUND OF THE INVENTION

The present invention relates to improvements in a system for detecting the position of a surface of a workpiece such as a wafer with excellent accuracy without touching the workpiece.

For example, in an electron beam exposure system in which a wafer is exposed directly to an electron beam without having any mask on the wafer, it is required to measure the height of the exposed surface of the wafer in order to place the focal point of the electron beam on the exposed surface of the wafer. When the electron beam has a depth of focus of about 5 μm, it is desirable to control the height of the exposed surface within about 5 μm. On the other hand, the height of the exposed surface is usually changed by about 500 μm. Therefore, the height of the exposed surface is measured with infrared rays, to which an electron beam resist material is insensitive. Since the exposed surface of the wafer may have been provided with various patterns (oxide, electrode, etc.), the reflectivity of the exposed surface for the infrared rays varies with the position, or there may be such surface part in which a plurality of portions different in reflectivity from each other are mixed together. In the case where the height of such an exposed surface is measured each time the wafer is moved, a serious error arises in a measured value due to a change in reflectivity or distribution of reflectivity at a measured region.

There are many methods for measuring the position (or altitude) of a surface of a workpiece. However, there are only a limited number of methods in which a measuring device can be mounted in an evacuated chamber having a limited volume as in an electron beam exposure machine and in which measurement can be done without causing interference with other devices and without exposing the resist film applied on the surface. For example, a method of measuring the height of a wafer is proposed in which a wafer is irradiated with a divergent light beam and the height of the wafer is determined on the basis of the intensity of reflected light incident on a predetermined light-receiving element. Another method is proposed in which a light beam is focused on a wafer to form a light spot, an image of the light spot is formed on a detector by the reflected light, and the height of the wafer is determined by the position of the image on the detector. An example of the latter method is disclosed in Japanese Patent Application No. 133,076/1975. In the case where a surface of a wafer is provided with a pattern and therefore the reflectivity of the surface varies with the position, the intensity of light which is reflected from the surface of the wafer and then incident on a detector, and the intensity distribution of the above light vary depending upon the positions at which measuring light is incident on the surface of the wafer. In this case, it is impossible to use the former method. Further, there arises in the latter method problems that the accuracy with which the position of the wafer is measured, is decreased and therefore it is very difficult to obtain a correct measured value.

SUMMARY OF THE INVENTION

An object of the present invention is to provide a position detecting system in which the position of a surface of a workpiece can be detected without touching the surface of the workpiece by using light, and in which correct detection can be provided even when the reflectivity of the surface varies with the position on the surface or even when portions different in reflectivity from each other are mixed together in the area of a light spot formed on the surface.

In order to attain the above object, in a system according to the present invention, firstly, a feedback circuit is provided between a light source and a detector so that the quantity of light incident on the detector is always kept equal to a preset reference value. Thus, even when the reflectivity of a surface of a workpiece such as a wafer is varied, the quantity of light incident upon the detector is kept constant, and therefore the generation of error due to a change in light quantity incident on the detector is avoided in measuring the height of the surface. In more detail, the light quantity incident on the detector is detected and compared with a preset reference value, and a difference between the detected value and the reference value is fed back to the driving current of a light source (such as a semiconductor laser and a light emitting diode) so that the above difference becomes equal to zero. Thus, the light quantity on a detecting surface of the detector is so controlled as to be kept constant. Accordingly, an operating point (voltage and/or current) of a measuring circuit is kept constant, and therefore the error due to a change in operating point can be reduced.

Further, it is preferable to compensate a change in a position detecting signal due to variations in light quantity by using two or more signals. Variations of the position detectiong signal due to variations in light quantity can be compensated for, for example by dividing a signal proportional to both the position of a light spot on the detecting surface and the light quantity at the light spot by a signal proportional to only the light quantity. That is, a high accuracy measurement can be made by keeping constant the light quantity on the detecting surface and by correcting the position detecting signal using the above light quantity.

Secondly, the diameter of a light spot on the surface of the wafer is made smaller than a length 9 times the depth of focus of an electron beam. By using such a small light spot, the error due to distribution of reflectivity at the wafer surface is made negligibly small from the practical point of view, in the case where portions different in reflectivity from each other are mixed together on the wafer surface. When a detector is employed which delivers an output proportional to a product of the light intensity and the distance on the detector surface between a light receiving point and a reference point, the measured position of a light spot corresponds to the so-called center of intensity. In the case where portions different in reflectivity from each other are mixed together at the wafer surface and thus the distribution of reflectivity varies with the position on the wafer surface, an error in the altitude measurement arises due to the movement of the optical center of intensity of the light spot, even when the altitude of the wafer surface is kept constant. As is known from calculation, when a circular light spot moves across a boundary between two regions, one of which is twice as large in reflectivity as the other, the optical center of intensity of the light spot is moved from the center of the light spot by one-ninth of the diameter of the spot.

Since two regions one of which is at least twice as large in reflectivity as the other, are usually mixed together at the wafer surface, it is required to make the diameter of the light spot less than a length corresponding to 9 times an allowable error (it is preferred to make the diameter of the light spot smaller and more preferably nearly equal to the allowable error). The allowable error in an electron beam exposure system is the depth of focus of the electron beam. The electron beam in the electron beam exposure system has usually a depth of focus of several microns, and typically a depth of focus of about 5 μm. Accordingly, the spot diameter at the wafer surface is required to be not greater than tens of microns, typically, not greater than about 50 μm.

In a system according to the present invention, light impinges on a surface of a workpiece, the position of the surface is detected on the basis of a signal which depends upon the intensity of the reflected light and the position of an image formed by the reflected light, without touching the workpiece, and moreover the position of the surface can be measured at high accuracy even when the reflectivity of the surface varies with the position or even when regions different in reflectivity from each other are mixed in the irradiated spot area. A position detecting system according to the present invention is applicable to an electron beam exposure system and others.

DESCRIPTION OF THE PREFERRED EMBODIMENTS

Figure 5A:
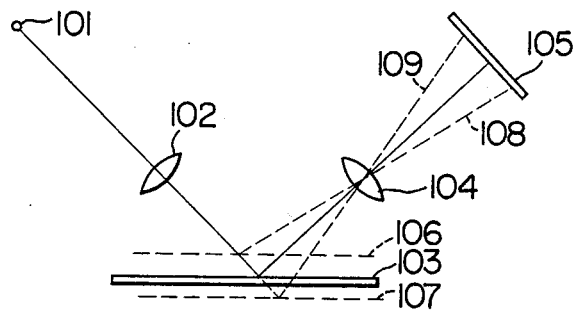
FIGS. 5A and 5B are views for explaining an optical position measuring system of the prior art.
Figure 5B:
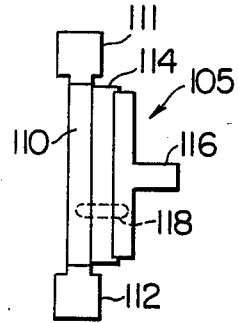

Prior to the explanation of the present invention, an optical position (or height) measuring system proposed in the previously-referred Japanese Patent Application No. 133,076/1975 will be explained, with reference to FIGS. 5A and 5B. Referring to FIG. 5A, light emitted from a light source 101 which is extended in the direction perpendicular to the paper, is focused on a wafer 103 with a lens 102 to form a line image. Reflected light from the wafer 103 is focused on a detector 105 with a lens 104. As shown in FIG. 5B, the detector 105 includes a resistive strip 110 having at both ends thereof current terminals 111 and 112, a photoconductive strip 114 extended along the resistive strip 110 and made of such a photoconductive material as CdS, and a voltage detecting electrode 116 placed opposite to the resistive strip 110 and kept in contact with the photoconductive strip 114. A constant current is caused to flow through the resistive strip 110 through the current terminals 111 and 112 to generate a potential gradient in the resistive strip 110. When an image 118 of the light source 101 is formed on the photoconductive strip 114, part of the strip 114 which is irradiated with light, becomes small in resistance, and therefore a voltage at a corresponding part of the resistive strip 110 is supplied to the electrode 116. Thus, it can be known what part of the detector 105 is irradiated with light. When the wafer 103 rises and falls as indicated by dotted lines 106 and 107 in FIG. 5A, the optical path of the reflected light is moved as indicated by dotted lines 108 and 109, and the position of the image 118 is also moved. A change in position of the image 118 is detected as a change in voltage at the electrode 116. Thus, the altitude of the wafer 103 can be measured.

In the case where the position of the wafer 103 is kept constant but the light intensity at the image 118 of the light source is varied, the resistance of that part of the photoconductive strip 114 which is irradiated with light, is also varied. A certain amount of current necessarily flows through the voltage detecting electrode 116 to detect a signal. Accordingly, the above change in resistance at the photoconductive strip 114 causes a change in voltage at the electrode 116. This change in voltage at the electrode 116 further depends upon the position where the photoconductive strip 114 is irradiated with light. Therefore, such a change in characteristic causes an error which cannot be neglected, when the position of the wafer 103 has to be measured with high accuracy. Further, when a distribution of light intensity is generated in the image 118 of the light source, the detector 105 has a higher sensitivity for a brighter portion and therefore an error is produced in the position measurement even if the integral light intensity (namely, the quantity of received light) is kept constant. A similar problem arises in the case where a detector including optical fibers arranged in a line and an array of photodiodes photo-coupled with the optical fibers is employed in place of the detector 105. Further, an error arises in the position measurement when the image 118 of the light source has a shape different from a predetermined one due to the superposition of undesired reflected light or other phenomena.

Therefore, it has been desired to provide a position detecting system which can solve the above-mentioned problems, which is simple in structure, and which allows a high-accuracy position detection.

Figure 1:
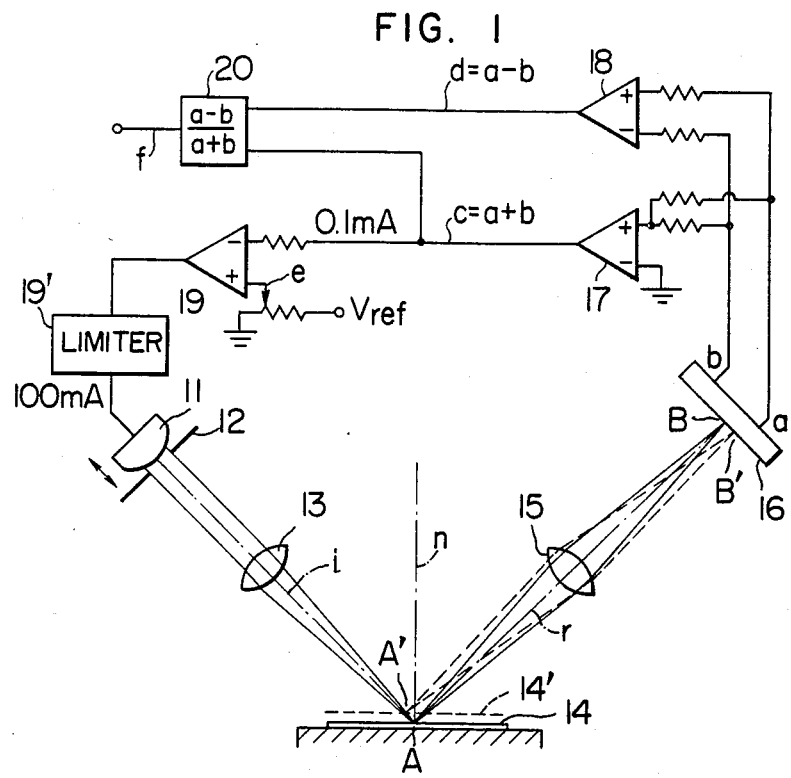
FIG. 1 is a block diagram showing an embodiment of the present invention.

FIG. 1 shows an outline of an embodiment of a position detecting system according to the present invention. Referring to FIG. 1, a light beam emitted from a light source 11 which is a semiconductor laser, passes through a diaphragm (namely, a stop) 12 so as to have predetermined form and area in cross section, and is then focused with a lens 13 on a workpiece 14 which is placed on an XYZ table and is to be measured, in order to form a first image on the workpiece 14. Light reflected from the workpiece 14 is focused on a photodetector 16 with a lens 15 to form a second image on the photodetector 16. In a preferred example, a GaAs laser available from Hitachi Ltd. was used as the light source 11. The above-mentioned GaAs laser emits output light having a center oscillation wavelength of about 8300Å and is typically driven by a current of the order of 100 mA. The spot at the output surface of this laser had a diameter of about 200 to 500 μm. The emitted light has a central (strong) ray spreading angle of about 20° and weak ray spreading angle of about 60°. The light source 11 is arranged on and movable along an incident optical axis i. The stop 12 is placed at a fixed position and is replaceable. An angle of incidence between the incident optical axis i and a normal n to the workpiece 14 (or the XYZ table) is set to about 45°. An angle of reflection between the normal n and a reflection optical axis r is also set to about 45°. The surface of the detector 16 is arranged substantially perpendicular to the reflection optical axis r, and therefore is approximately parallel to the incident optical axis i. When the workpiece 14 is arranged so that the surface thereof has a predetermined height, the clearest light spots are formed on the workpiece 14 and on detector 16. The lens 13 forms the first image at a reduction rate of 1/5 to 1/10, and the lens 15 forms the second image at a magnification of 5× to 10×. The light spot on the workpiece has an approximately circular form, and has a diameter of less than about 500 μm, typically, a diameter of less than about 200 μm.

When the surface 14 of the workpiece is moved to a position 14' in the above-mentioned arrangement, the light spot on the workpiece is moved from a point A to another point A'. Accordingly, that image of the light spot on the workpiece which is formed on the detector, namely, the second image is moved from a point B to another point B'. That is, a change in level of the workpiece 14 is converted into a displacement of the second image on the detector 16. Accordingly, the position (or the height) of the surface of the workpiece 14 can be measured by detecting the position of the second image on the detector. The light source 11 may be a semiconductor laser or a light emitting diode. A semiconductor laser is preferably used as the light source 11 to obtain a small light spot of high brightness.

Figure 2:
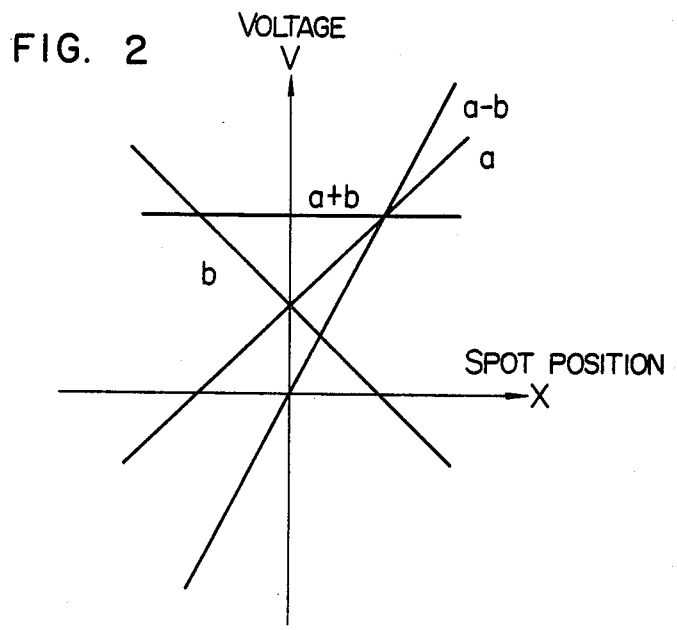
FIG. 2 is a graph showing relations between the output voltage (V) of a detector and the position (X) of an image formed on the detector.

Unlike the detector 105 shown in FIG. 5B, the detector 16 generates two kinds of signals a and b. FIG. 2 shows relations between the position X of the light spot on the light receiving surface of the detector 16 and respective voltages of the signals a and b in the case where the intensity of received light is kept constant. The slope of the signal a and that of the signal b are equal in magnitude to each other and opposite in sign to each other. That is, $da/dX = -db/dX$. In the example shown in FIG. 2, the signals a and b varies from negative to positive and from positive to negative, respectively. However, when a unipolar power source is employed, the signals a and b are also unipolar. When a position satisfying an equation $a=b$ is used as an origin of the position X of the second image, the signals a and b can be given by the following equations:

$$a = pX + q, \ b = -pX + q$$

where coefficients p and q are similarly proportional to the intensity of received light. A photodetector having such a characteristic is available from the market. As shown in FIG. 1, a sum voltage $c = m(a+b)$ and a difference voltage $d = n(a-b)$ are formed by an adding amplifier 17 and a subtracting amplifier 18, respectively, using the signal voltages a and b. As shown in FIG. 2, the sum voltage signal $c = 2mq$ is independent of the position of the second image and is proportional to the light intensity. On the other hand, the difference voltage signal $d = 2npX$ is proportional to both the position of the second image and the light intensity. Incidentally, in FIG. 1, amplification factors m and n are omitted. It is obvious to those skilled in the art that a photodetector system delivering such two signals or more signals is not limited to that shown in FIG. 1. The sum voltage signal c is supplied to both the signal input terminal of a negative-feedback amplifier 19 and the denominator input terminal of a division circuit 20. The difference voltage singal d is supplied to the numerator input terminal of the division circuit 20. The division circuit 20 carries out the following division:

$$l(d/c) = (lnp/mq)X$$

where l is a coefficient. The coefficient l is also omitted in FIG. 1. Though each of the coefficients p and q is a function of light intensity, the quotient p/q is substantially independent of light intensity. Each of the amplification factors l, m and n can be considered to be a constant since an input level is kept constant. Accordingly, an output f of the division circuit is a signal which indicates the height of the workpiece 14 faithfully.

The sum voltage signal c which indicates the intensity of received light, is supplied to the signal input terminal of the amplifier 19, the other input terminal of which receives a preset reference voltage from an output terminal e of a potentiometer. The amplifier 19 provides a negative feedback to the light source in accordance with a difference between the signal input voltage and the reference votlage. That is, the negative feedback is provided to the light source in accordance with a change in intensity of the reflected light, and therefore the second image having a fixed light intensity is formed on the detector 16 even when the reflectivity of the workpiece 14 is varied. A limiter 19' prevents an overcurrent from flowing through the light source in the case where the reflectivity of the workpiece 14 is extremely low or null.

Thus, the detector 16 receives a light spot having an approximately constant light intensity, and therefore the output of the detector 16 is substantially dependent upon only the position of the light spot. Further, the division circuit 20 compensates the signal indicating the position of the light spot by the signal indicating the intensity of received light, and therefore the output f of the division circuit 20 becomes a signal which indicates faithfully the position of the light spot, that is, the height of the workpiece 14. As mentioned above, when the reflectivity of the workpiece 14 within the first image is uniform, the height of the workpiece 14 can be measured with high accuracy, independently of the reflectivity.

Figure 4:
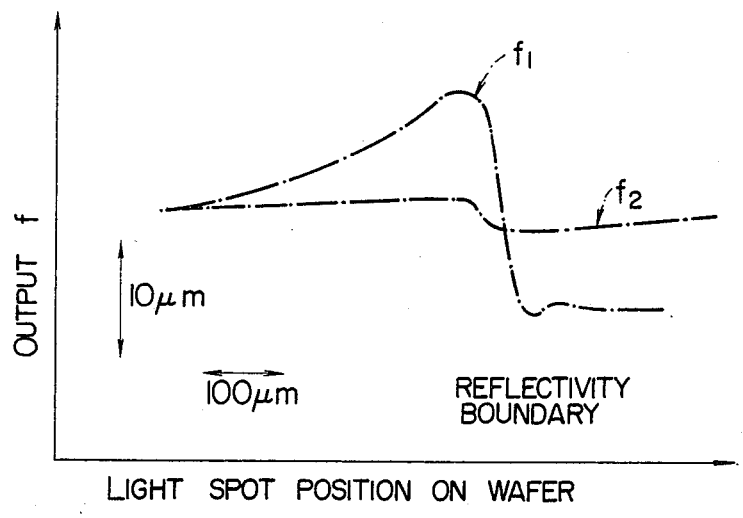
FIG. 4 shows characteristic curves for explaining an advantage of the present invention.

However, in the case where a plurality of regions different in reflectivity from each other are mixed together at the surface of a workpiece as in the surface of a semiconductor wafer having an integrated circuit pattern, when the surface of the workpiece is displaced, the intensity distribution in a light spot formed on the detector is varied and therefore the output of the detector is varied even if the surface of the workpiece is kept constant in height. That is, the detector delivers an output signal corresponding to the case where the height of the workpiece is varied, and thus an error arises in measuring the height of the workpiece. A curve $f_1$ in FIG. 4 shows an example of such an error. When a light spot moves across a boundary between two regions different in reflectivity from each other, the output of the detector is varied as indicated by the curve $f_1$. This phenomenon is based upon the facts that a distribution of received light intensity is present within the light spot formed on the detector, and that a point representing the position of the light spot moves with a change in distribution of light intensity. This phenomenon is remarkable as the diameter of the light spot is greater, and is more remarkable in the case where undesired reflected light is superposed on the light spot so as to form a flare.

It is effective in solving the above problem to condition the form of the first image by the stop 12 and to make small the dimension of the aperture in the stop 12. By using an appropriate stop, the first image on the workpiece 14 can be made small and the error caused by a change in intensity distribution can be reduced. For example, when a measuring light spot moves across a boundary between two regions one of which is twice as large in reflectivity as the other, there arises an error of the order of one-ninth the diameter of the light spot. Accordingly, it is required to make the diameter of the light spot on the workpiece smaller than at least a value which is nine times as large as an allowable error. The stop 12 and parameters of optical system are selected so that the above-mentioned condition is satisfied when the first image of the light source is formed on the workpiece.

Figure 3:
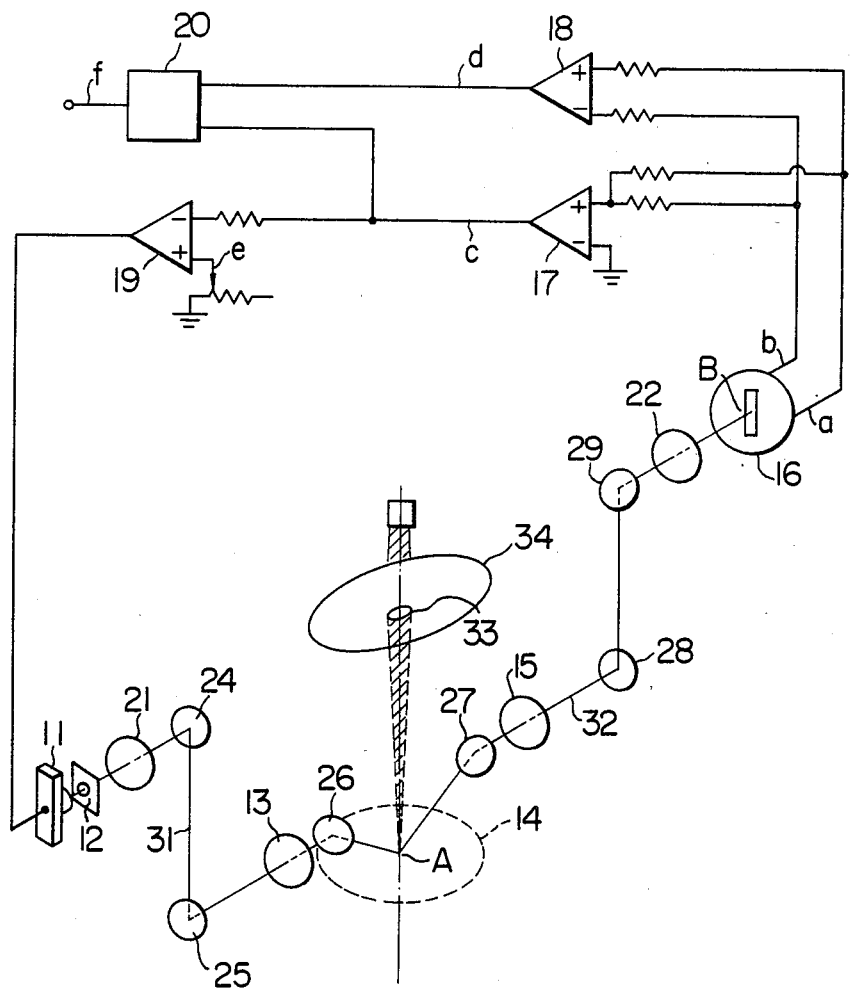
FIG. 3 is a perspective view showing another embodiment of the present invention which is applied to an electron beam exposure system.

FIG. 3 is a perspective view showing another embodiment of the present invention which is applied to an electron beam exposure system. In FIGS. 1 and 3, like parts are given the same reference numerals. Referring to FIG. 3, reference numeral 11 designates a semiconductor laser forming a light source, 12 a stop for restricting the dimension of the light source, 13 a lens for forming an image of the light source on the surface of a workpiece 14 such as a wafer in the form of a light spot, 15 a lens for forming an image of the light spot on a detector 16, 17, 18 and 19 amplifiers, and 20 a division circuit. Windows 21 and 22 are used to separate an evacuatable chamber of an electron beam exposure system from the outside. That is, the light source 11 and the detector 16 are arranged outside the evacuated chamber. The windows 21 and 22 may cooperate with the lenses 13 and 15, respectively so as to form lens systems. Flat mirrors 24 to 29 are used to bend optical paths 31 and 32 so that a desired optical system can be formed in the evacuated chamber having a limited volume.

An electron beam 33 is focused on the surface of the workpiece 14 with an electron lens 34. The diameter of the light spot at a point A on the workpiece 14 is made smaller than or equal to nine times the depth of focus of the electron beam at the point A (namely, the depth of focus measured in the direction perpendicular to a focal plane). It may be noted that the required spot diameter on the workpiece may vary with the change of the angle of reflection and that the required dimensions of the diaphragm may vary with the change of the angle of incidence.

The output f of the division circuit 20 indicates the height of the wafer surface to be detected, and is sent through an analog-to-digital converter to a computer for controlling the electron beam exposure system. Thus, the electron lens 34 is controlled by the output signal f, and the electron beam 33 converges into the point A, that is, a focal point is formed at the point A.

An evacuatable apparatus such as an electron beam apparatus is required to make the volume thereof as small as possible. If means for bending optical paths are not employed in the evacuatable apparatus, an optical system mountable in the apparatus having such a limited volume has an extremely-restricted performance. The means 24 to 29 for bending the optical paths can mitigate such restriction. In FIG. 3, each of the flat mirrors 26 and 27 converts a horizontal optical path into an inclined optical path. Further, a pair of flat mirrors 24 and 25 change the height of a horizontal optical path, and a pair of flat mirrors 28 and 29 change the height of another optical path. Thus, an optical system with desired performance can be formed. By using such an optical system and selecting the stop 12 having an aperture of appropriate form and dimension, a desired small light spot (for example, having a diameter of about 50 $\mu$m) can be formed on the workpiece 14. It is preferred, if not required, to form the optical paths 31 and 32 approximately symmetrically.

The above-mentioned structure can greatly improve an accuracy with which the position of a surface of a workpiece is measured. In the embodiment shown in FIG. 3, for example, the diameter of the substantially circular light spot formed on the wafer is made nearly equal to 14 $\mu$m, and the height of the wafer surface where two regions different in reflectivity by a factor of 10 are mixed, can be measured with an error of not over $\pm 5$ $\mu$m. According to the present invention, an error arising in measuring the height of a surface of a wafer can be made smaller than or equal to the depth of focus of an electron beam used. A curve $f_2$ in FIG. 4 shows an effect obtained by the present embodiment. As is apparent from FIG. 4, variations in output becomes small as compared with the conventional case, and therefore the error in the detection is decreased.

While infrared rays are employed in the embodiments, light for measuring the height of the workpiece is not limited to infrared rays. Light sources other than the semiconductor laser and light emitting diode may be employed. The present invention is also applicable to many appratuses and systems other than the electron beam exposure system. It is obvious to those skilled in the art that various modifications and changes of the above-mentioned embodiments can be made without departing from the spirit and scope of the invention.

We claim:

1. A system for detecting a height position of a workpiece suitable for use in an electron beam exposure apparatus which includes an electron beam source for forming an electron beam having a depth of focus in an evacuatable chamber and a movable table for supporting said workpiece to irradiate said workpiece with said electron beam, the system comprising:

means for emitting a light beam to form a light spot on a surface of a workpiece, said light beam means including a light source for emitting said light beam and a stop for restricting said emitted light beam, said stop delimiting the diameter of said light spot on the surfaces of the workpiece to be smaller than or equal to nine times the depth of focus of the electron beam at a position on the surface;

light detecting means having a detecting surface;

optical means for focusing light reflected from the surface of the workpiece on said detecting surface of said light detecting means to form an image of said light spot thereon, said light detecting means generating a first signal related to an intensity of said light spot on said detecting surface and a second signal related to a position and the intensity of said light spot on said detecting surface;

negative feedback means for feeding said first signal back to said light beam means to maintain constant the intensity of said light spot on said detecting surface; and circuit means for dividing said second signal with said first signal to form a third signal independent of the intensity of light on said detecting surface and indicative of the height position of the workpiece, whereby an accurate indication of the height position of the workpiece is obtained independently of variations in reflectivity of the surface of the workpiece or when different reflectivity surface portions of the workpiece are mixed together in the area of said light spot formed on the surface of the workpiece.

2. The system according to claim 1, wherein said light detecting means includes a light detector for generating two signals, each of which has a level proportional to the position of said light spot and to the intensity of the light, the derivative of the two signals with respect to the position being opposite in polarity and same in magnitude, adder means for adding the two signals so as to generate said first signal, and subtractor means for subtracting one of the two signals from the other so as to generate said second signal.

3. The system according to claim 1, wherein said light beam means includes a reduction lens for obliquely projecting a reduced image of said light source on the surface of the workpiece, and said optical means for focusing reflected light includes a magnification lens for collecting obliquely reflected light and projecting a magnified image normally on said detecting surface.

4. The system according to claim 3, wherein said reduction lens has a reduction ratio of 1/5 to 1/10 and said magnification lens has a magnification ratio of 5 to 10.

5. The system according to claim 3, wherein the optical axes of said reduction lens and said magnification lens have an angle of about 45° to the normal of the workpiece.

6. A system according to claim 1, wherein said stop further delimits the diameter of said light spot on the surface of the workpiece to be no smaller than the depth of focus of the electron beam at a position on the surface of the workpiece.

7. A system for detecting a height position of a semiconductor wafer carrying patterns of different reflectivity, adaped for use in an electron beam exposure apparatus wherein an electron beam having a depth of focus of the order of microns is irradiated normally to the semiconductor wafer in an evacuatable chamber, the system comprising:

incident optical light means for obliquely irradiating a light spot on the semiconductor wafer, said incident optical light means including a laser source movable along an incident optical axis for emitting a light beam, a replaceable stop disposed at a fixed position on the incident optical axis for delimiting a size and a shape of the light beam, said stop delimiting the diameter of said light spot on the semiconductor wafer to be smaller than or equal to nine times the depth of focus of the electron beam at a position on the semiconductor wafer, and a reduction lens disposed on the incident optical axis for obliquely projecting a reduced image of the laser source on the semiconductor wafer, at least said laser source and said replaceable stop being disposed outside of the evacuatable chamber;

reflection optical means for collecting obliquely reflected light from the semiconductor wafer and projecting an image of said light spot on a detecting surface of a detector means, said reflection optical means including a magnification lens disposed on a reflection optical axis for forming a magnified image of said light spot, said detector means having, said detecting surface thereof disposed substantially perpendicular to the reflection optical axis for generating one signal having a level increasing with a position on said detecting surface and with the intensity of the light and another signal having a level decreasing with the position and increasing with the intensity of the light;

adder means for adding said one and said another signals to generate a first signal related to the intensity of said light spot on said detecting surface;

subtractor means for subtracting said another signal from said one signal to generate a second signal related to the position and the intensity of said light spot on said detecting surface;

negative feedback means for feeding said first signal back to said laser source to maintain constant the intensity of said light spot on said detecting surface; and circuit means for dividing said second signal by said first signal to form a third signal independent of the intensity of light and indicative of the position of said light spot on said detecting surface and the height position of the semiconductor wafer, whereby an accurate indication of the height position of the semiconductor wafer is obtained independently of variations in reflectivity of the semiconductor wafer or when different reflectivity portions of the semiconductor wafer become mixed together in the area of said light spot formed on the semiconductor wafer.

8. The system according to claim 7, wherein said reduction lens has a reduction ratio of 1/5 to 1/10 and said magnification lens has a magnification ratio of 5 to 10.

9. The system according to claim 7, wherein the optical axes of said reduction lens and said magnification lens have an angle of about 45° to the normal of the workpiece.

10. A system according to claim 7, wherein said stop further delimits the diameter of said light spot on the semiconductor wafer to be no smaller than the depth of focus of the electron beam at a position on the semiconductor wafer.

* * * * *